(12) United States Patent
Shirai

(10) Patent No.: US 11,299,631 B2
(45) Date of Patent: Apr. 12, 2022

(54) ASPHALT COMPOSITION FOR ROAD PAVING

(71) Applicant: KAO CORPORATION, Tokyo (JP)

(72) Inventor: Eiji Shirai, Wakayama-ken (JP)

(73) Assignee: KAO CORPORATION, Tokyo (JP)

( * ) Notice: Subject to any disclaimer, the term of this patent is extended or adjusted under 35 U.S.C. 154(b) by 456 days.

(21) Appl. No.: 16/478,074

(22) PCT Filed: Jan. 18, 2017

(86) PCT No.: PCT/JP2017/001583
§ 371 (c)(1),
(2) Date: Jul. 15, 2019

(87) PCT Pub. No.: WO2018/134921
PCT Pub. Date: Jul. 26, 2018

(65) Prior Publication Data
US 2019/0359827 A1    Nov. 28, 2019

(51) Int. Cl.
*C08L 95/00*    (2006.01)

(52) U.S. Cl.
CPC ........... *C08L 95/00* (2013.01); *C08L 2555/54* (2013.01); *C08L 2555/80* (2013.01)

(58) Field of Classification Search
CPC ... C04B 26/26; E01C 7/08; E01C 7/18; E01C 7/26; E01C 7/262; E01C 7/265; E01C 7/267; C08L 2555/40; C08L 2555/50; C08L 2555/52; C08L 2555/54; C08L 2555/60; C08L 2555/62; C08L 2555/64; C08L 2555/70; C08L 2555/72; C08L 2555/74; C08L 2555/80; C08L 2555/82; C08L 2555/84; C08L 2555/86; C08L 67/00; C08L 67/02; C08L 67/025; C08L 67/03; C08L 67/04; C08L 67/06; C08L 67/07; C08L 67/08; C08L 95/00; C08L 95/005

See application file for complete search history.

(56) References Cited

U.S. PATENT DOCUMENTS 5,460,649 A * 10/1995 Strassman ............... C04B 26/26
                                                           106/282

FOREIGN PATENT DOCUMENTS

| CN | 102585522 A | * | 7/2012 |
|----|-------------|---|--------|
| EP | 0 425 151 A1 | | 5/1991 |
| JP | 54-69136 A | | 6/1979 |
| JP | 4-8766 A | | 1/1992 |
| JP | H048766 A | * | 1/1992 |
| JP | 4-320453 A | | 11/1992 |
| JP | 10-237309 A | | 9/1998 |
| JP | 2000-44808 A | | 2/2000 |
| JP | 2000044808 A | * | 2/2000 |
| JP | 2000-72499 A | | 3/2000 |
| JP | 2000072499 A | * | 3/2000 |
| JP | 2001-40099 A | | 2/2001 |
| JP | 2001-131348 A | | 5/2001 |
| JP | 2003-277613 A | | 10/2003 |
| JP | 2013-222044 A | | 10/2013 |
| WO | WO 2013/106623 A1 | | 7/2013 |

OTHER PUBLICATIONS

CN102585522 English Machine Translation, prepared Nov. 19, 2021. (Year: 2021).*
JP2000-072499 English Machine Translation, prepared Nov. 19, 2021. (Year: 2021).*
JP2000-044808 English Machine Translation, prepared Nov. 19, 2021. (Year: 2021).*
JPH04-8766 English Machine Translation, prepared Nov. 19, 2021. (Year: 2021).*
International Search Report issued in PCT/JP2017/001583 (PCT/ISA/210), dated Feb. 14, 2017.
Extended European Search Report, dated Jul. 31, 2020, for European Application No. 17892679.6.
Park et al., Evaluation of Pyrolized Carbon Black from Scrap Tires as Additive in Hot Mix Asphalt, Transportation Research Record, Transportation Research Board, vol. 1530, Jan. 1, 1996, pp. 43-50, XP009114953.
Park et al., "Using Pyrolized Carbon Black (PCB) from Waste Tires in Asphalt Pavement (Part I, Limestone Aggregrate)," Final Report, Purdue University, Joint Highway Research Project, Project No. C-36-55L, File No. Feb. 12, 2013, Feb. 20, 1996, pp. i-xviii, 1-314 (355 pages total), XP002522318.
Rahman et al. "Green Pavement Using Recycled Polyethylene Terephthalate (PET) as Partial Fine Aggregate Replacement in Modified Asphalt," Procedia Engineering, vol. 53, 2013 (Jan. 1, 2013), pp. 124-128, XP055552789.

(Continued)

*Primary Examiner* — Christopher M Rodd
(74) *Attorney, Agent, or Firm* — Birch, Stewart, Kolasch & Birch, LLP

(57) ABSTRACT

The present invention relates to an asphalt composition for road pavement, which is excellent in drying strength, strength after immersion in water, and strength after immersion in petroleum, a method for producing the same, and a road paving method.
[1] An asphalt composition for road pavement, containing asphalt, a polyester resin, and an aggregate, wherein the polyester resin is one subjected to melt-kneading and a ratio of the polyester resin is 5 parts by mass or more and 50 parts by mass or less based on 100 parts by mass of the asphalt; [2] a method for producing an asphalt composition for road pavement, including a step of mixing asphalt, a polyester resin, and an aggregate at 130° C. or higher and 200° C. or lower, wherein the polyester resin used in the mixing step is one subjected to melt-kneading, and a ratio of the polyester resin is 5 parts by mass or more and 50 parts by mass or less based on 100 parts by mass of the asphalt; and [3] a road paving method including a step of laying an asphalt composition obtained by the method of [2], thereby forming an asphalt paving material layer.

20 Claims, No Drawings

(56) References Cited

OTHER PUBLICATIONS

Rostler et al., "Carbon Black as a Reinforcing Agent for Asphalt," Proceedings of the Association of Asphalt Paving Technologists (AAPT), vol. 46, Jan. 1, 1977, pp. 376-401, XP009114874.
Seman et al., "Toner Fines as an Asphalt Concrete Additive," Xerox Disclosure Journal, vol. 18, No. 4, Jul./Aug. 1993, pp. 467-468, XP013018863.
Yildirim et al., "Toner-modified Asphalt Demonstration Projects," Resources, Conservation and Recycling, vol. 42, No. 3, 2004 (Oct. 1, 2004), pp. 295-308, XP004547053.
Zeng et al., "Using Pyrolized Carbon Black (PCB) from Waste Tires in Asphalt Pavement (Part II: Asphalt Binder, and Test Road)." Final Report, Purdue University, Joint Highway Research Project, Project No. C-36-55L, File No. Feb. 12, 2013, Feb. 20, 1996, pp. i-x;1-142 (154 pages total), XP002522319.
Zhang et al., "Evaluation of the Improved Properties of SBR/ weathered Coal Modified Bitumen Containing Carbon Black," Construction and Building Materials, vol. 23, No. 7, 2009 (Available online Jan. 22, 2009), pp. 2678-2687, XP026084281.

\* cited by examiner

ASPHALT COMPOSITION FOR ROAD PAVING

FIELD OF THE INVENTION

The present invention relates to an asphalt composition for road pavement, a method for producing the same, and a road paving method.

BACKGROUND OF THE INVENTION

Asphalt pavement using an asphalt composition has been performed for paving driveways, parking spaces, cargo yards, sidewalks, etc., because of relatively easy construction and a short period of time from beginning of paving works to traffic start.

The asphalt pavement includes a road surface which is formed of an asphalt composition containing aggregates bonded through asphalt, and hence, paved roads exhibit good hardness and good durability.

However, since asphalt is a petroleum refined product, it has a property of dissolving in gasoline, light oils, heavy oils, kerosene, and engine lubricants, or the like, which is a petroleum refined product as well. For this reason, if fuels or lubricants leak on the road surface from vehicles, etc., the asphalt tends to be dissolved in the fuels or lubricants, which will lead to erosion of the asphalt composition and occurrence of pavement destruction, such as formation of pot holes. Therefore, in such a case, repair of the pavement is inevitably needed, which results in increased maintenance costs and significant influence on car traffic.

PTL 1 describes an asphalt binder for draining pavement, which is composed of 92 to 70 parts by mass of asphalt, 3 to 15 parts by mass of a thermoplastic elastomer, and 4 to 15 parts of carbon black, as an asphalt binder having a uniform property, which does not separate even during long-term storage.

PTL 2 describes a method for producing an asphalt modifier by kneading carbon black and oil with a thermoplastic elastomer, characterized by a kneading temperature of 80 to 200° C., a kneading time of 1 to 30 minutes, a shear rate at the time of kneading of 50 to 800 ($sec^{-1}$), and a shear energy acting per 1 $cm^3$ of carbon black at the time of kneading of 200 to 3000 ($J/cm^3$), as a method for producing an asphalt modifier which is not separated even when stored for a long time, and which is compatible with other required characteristics in a high level.

PTL 3 describes a method for producing an asphalt modifier, characterized by adding and mixing an oil and carbon black in the presence of a thermoplastic elastomer produced by a polymerization reaction and a polymerization medium used for the polymerization reaction and then removing the polymerization medium, as a method for producing an asphalt modifier that simplifies the process of producing modified asphalt used for pavement materials of high added value such as low noise and high drainage compared to the conventional process and that is not inferior in quality to that produced via the conventional process.

PTL 4 describes a method for producing an asphalt modifier having a step of kneading rubber and/or a thermoplastic elastomer and mineral oil with a screw type kneading extruder at a shear rate of 30 to 50 ($sec^{-1}$), as a method for producing an asphalt modifier which provides a highly stable modified asphalt and is excellent in work efficiency and stability at the time of production.

CITATION LIST

Patent Literature

PTL1: JP 10-237309A
PTL2: JP 2001-40099A
PTL3: JP 2001-131348A
PTL4: JP 2003-277613A

SUMMARY OF THE INVENTION

That is, the present invention relates to the following [1] to [3].
[1] An asphalt composition for road pavement, containing:
  asphalt;
  a polyester resin; and
  an aggregate,
  wherein the polyester resin is one subjected to melt-kneading and a ratio of the polyester resin is 5 parts by mass or more and 50 parts by mass or less based on 100 parts by mass of the asphalt.
[2] A method for producing an asphalt composition for road pavement, including:
  a step of mixing asphalt, a polyester resin, and an aggregate at 130° C. or higher and 200° C. or lower,
  wherein the polyester resin used in the mixing step is one subjected to melt-kneading, and a ratio of the polyester resin is 5 parts by mass or more and 50 parts by mass or less based on 100 parts by mass of the asphalt.
[3] A road paving method including a step of laying an asphalt composition obtained by the method as set forth in [2] above, thereby forming an asphalt paving material layer.

DETAILED DESCRIPTION OF THE INVENTION

Such an asphalt composition that even in a rainy weather or even when immersed in the leaked gasoline or oil, it keeps high strength and is hardly rutted has been required. However, PTL 1 to PTL 4 are not necessarily satisfactory from any point of view of dry strength, strength after immersion in water, and strength after immersion in petroleum.

Now, the present invention relates to an asphalt composition for road pavement, which is excellent in dry strength, strength after immersion in water, and strength after immersion in petroleum, a method for producing the same, and a road paving method using the same.

The present inventor has found that the dry strength, the strength after immersion in water, and the strength after immersion in petroleum are improved by using a melt-kneaded polyester resin.

That is, the present invention relates to the following [1] to [3].
[1] An asphalt composition for road pavement, containing:
  asphalt;
  a polyester resin; and
  an aggregate,
  wherein the polyester resin is one subjected to melt-kneading and a ratio of the polyester resin is 5 parts by mass or more and 50 parts by mass or less based on 100 parts by mass of the asphalt.
[2] A method for producing an asphalt composition for road pavement, including:
  a step of mixing asphalt, a polyester resin, and an aggregate at 130° C. or higher and 200° C. or lower,
  wherein the polyester resin used in the mixing step is one subjected to melt-kneading, and a ratio of the polyester resin is 5 parts by mass or more and 50 parts by mass or less based on 100 parts by mass of the asphalt.

[3] A road paving method including a step of laying an asphalt composition obtained by the method as set forth in [2] above, thereby forming an asphalt paving material layer.

According to the present invention, it is possible to provide an asphalt composition for road pavement, which is excellent in dry strength, strength after immersion in water, and strength after immersion in petroleum, a method for producing the same, and a road paving method using the same.

[Asphalt Composition for Road Pavement]

The asphalt composition for road paving according to the present invention contains asphalt, a polyester resin, and an aggregate, and the polyester resin is one subjected to melt-kneading, and a ratio of the polyester resin is 5 parts by mass or more and 50 parts by mass or less based on 100 parts by mass of the asphalt.

The asphalt composition for road pavement of the present invention is excellent in dry strength, strength after immersion in water, and strength after immersion in petroleum. Though the reasons are not always elucidated yet, the following may be considered.

In the present invention, it is considered that the polyester is entangled with various aggregates since a polyester resin used is subjected to melt-kneading to have an increased weight average molecular weight and a broad molecular weight distribution, so that the dry strength, the strength after immersion in water, and the strength after immersion in petroleum are improved. This is considered to be based on that the polyester resin having a broad molecular weight distribution enables dispersion of materials having hydrophilic properties and materials having hydrophobic properties in a wide range into the polyester resin.

[Polyester Resin]

The polyester resin is a polyester containing an alcohol component-derived constituent unit and a carboxylic acid component-derived constituent unit.

In the polyester, the alcohol component-derived constituent unit as referred to herein means a structure resulting from eliminating a hydrogen atom from the hydroxy group of the alcohol component; and the carboxylic acid component-derived constituent unit as referred to herein means a structure resulting from eliminating a hydroxy group from the carboxy group of the carboxylic acid component.

<Alcohol Component>

Examples of the alcohol component include aliphatic diols, aromatic diols, and trihydric or higher polyhydric alcohols. These alcohol components may be used alone or in combination with two or more thereof.

From the viewpoint of exhibiting excellent dry strength, the alcohol component contains an alkylene oxide adduct of bisphenol A, and preferably contains an alkylene oxide adduct of bisphenol A represented by the following formula (I):

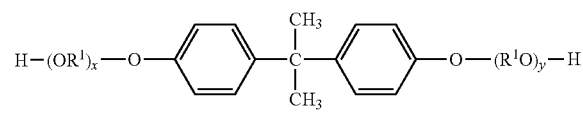

wherein each of $OR^1$ and $R^1O$ represents an alkylene oxide; $R^1$ represents an alkylene group having 2 or 3 carbon atoms; each of x and y represents a positive number expressing an average addition molar number of the alkylene oxide; and a sum total of x and y is 1 or more, and preferably 1.5 or more, and it is 16 or less, preferably 8 or less, and more preferably 4 or less.

Examples of the alkylene oxide adduct of bisphenol A represented by the foregoing formula (I) include a propylene oxide adduct of 2,2-bis(4-hydroxyphenyl)propane (hereinafter simply referred to as "a propylene oxide adduct of bisphenol A") and an ethylene oxide adduct of 2,2-bis(4-hydroxyphenyl)propane (hereinafter, also simply referred to as "an ethylene oxide adduct of bisphenol A"). Of these, a combination of a propylene oxide adduct of bisphenol A and an ethylene oxide adduct of bisphenol A is preferred.

In the alcohol component, the amount of the alkylene oxide adduct of bisphenol A is, from the viewpoints of increasing melt-dispersibility in the asphalt and attaining excellent dry strength, preferably 50 mol % or more, more preferably 65 mol % or more, still more preferably 80 mol % or more, yet still more preferably 90 mol % or more, and it is 100 mol % or less, more preferably 100 mol %.

When the alcohol component is a combination of a propylene oxide adduct of bisphenol A and an ethylene oxide adduct of bisphenol A, the molar ratio of the propylene oxide adduct of bisphenol A to the ethylene oxide adduct of bisphenol A is preferably 10/90 or more, more preferably 20/80 or more, and still more preferably 30/70 or more, from the viewpoints of more increasing the melt-dispersibility in the asphalt and obtaining more excellent dry strength and also from the viewpoint of improving the strength after immersion in water, and it is preferably 70/30 or less, more preferably 60/40 or less, and still more preferably 55/45 or less from the viewpoints of more increasing the melt-dispersibility in the asphalt and obtaining more excellent dry strength and also from the viewpoint of improving the strength after immersion in petroleum.

<Carboxylic Acid Component>

From the viewpoint of obtaining excellent dry strength, the carboxylic acid component preferably contains at least one selected from terephthalic acid, isophthalic acid, fumaric acid and maleic acid, more preferably contains at least one selected from terephthalic acid and fumaric acid, and still more preferably contains terephthalic acid.

In the carboxylic acid component, the amount of at least one selected from terephthalic acid, isophthalic acid, fumaric acid and maleic acid is 50 mol % or more, preferably 60 mol % or more, and more preferably 80 mol % or more, and it is preferably 100 mol % or less and more preferably 100 mol %, from the viewpoints of revealing excellent melt-dispersibility in the asphalt and improving the dry strength.

Examples of other carboxylic acid components include aromatic dicarboxylic acids other than terephthalic acid and isophthalic acid (hereinafter also referred to as "other aromatic dicarboxylic acids"), aliphatic dicarboxylic acids other than fumaric acid and maleic acid, tribasic or higher polycarboxylic acids, and acid anhydrides and alkyl (with 1 or more and 3 or less carbon atoms) esters thereof. These carboxylic acid components may be used alone or in combination of two or more thereof.

From the viewpoint of more improving the dry strength, the carbon number of the main chain of the aliphatic dicarboxylic acid is preferably 4 or more, and it is preferably 10 or less, more preferably 8 or less, and still more preferably 6 or less.

Specific examples thereof include oxalic acid, malonic acid, citraconic acid, itaconic acid, glutaconic acid, succinic acid, adipic acid, suberic acid, azelaic acid, sebacic acid, and dodecane diacid. In addition, examples of the aliphatic dicarboxylic acid also include succinic acids substituted with an alkyl group having 1 or more and 20 or less carbon atoms or an alkenyl group having 2 or more and 20 or less carbon atoms, such as dodecylsuccinic acid, dodecenylsuccinic acid, and octenylsuccinic acid. Among these, from the viewpoint of more improving the dry strength, adipic acid, dodecenyl succinic acid or octenyl succinic acid is preferred, and adipic acid is more preferred.

In the case where the other dicarboxylic acid is contained in the carboxylic acid component of the polyester resin, from the viewpoint of more improving the dry strength, a content of the other dicarboxylic acid is preferably 0.1 mol % or more, more preferably 1 mol % or more, and still more preferably 5 mol % or more, and it is preferably 40 mol % or less, more preferably 35 mol % or less, and still more preferably 30 mol % or less.

The tribasic or higher polycarboxylic acid is preferably a tribasic carboxylic acid.

Examples of the tribasic or higher polycarboxylic acid include tribasic or higher polycarboxylic acids such as trimellitic acid, 2,5,7-naphthalenetricarboxylic acid and pyromellitic acid, and acid anhydrides thereof and alkyl (with 1 or more and 3 or less carbon atoms) esters thereof. From the viewpoint of more improving the dry strength, trimellitic acid or acid anhydride thereof is preferred.

The content of the tribasic or higher polycarboxylic acid in the carboxylic acid component is, from the viewpoint of more improving the dry strength, preferably 1 mol % or more, more preferably 3 mol % or more, and still more preferably 5 mol % or more, and it is preferably 30 mol % or less, more preferably 20 mol % or less, and still more preferably 10 mol % or less.

(Molar Ratio of Carboxylic Acid Component-Derived Constituent Unit to Alcohol Component-Derived Constituent Unit)

From the viewpoint of showing high adhesive strength to the aggregate and improving the dry strength, a molar ratio of the carboxylic acid component-derived constituent unit to the alcohol component-derived constituent unit [(carboxylic acid component)/(alcohol component)] is preferably 0.7 or more, and more preferably 0.8 or more, and it is preferably 1.5 or less, more preferably 1.3 or less, still more preferably 1.1 or less, and yet still more preferably less than 1.0.

It is to be noted that from viewpoint of controlling physical properties, a monoalcohol may be properly contained in the alcohol component, and a monocarboxylic acid compound may be properly contained in the carboxylic acid component.

(Physical Properties of Polyester Resin Before Melt-Kneading)

The physical properties of the polyester resin before melt-kneading are described below.

The acid value of the polyester resin is preferably 2 mgKOH/g or more, more preferably 3 mgKOH/g or more, and still more preferably 3.5 mgKOH/g or more, and it is preferably 30 mgKOH/g or less, more preferably 15 mgKOH/g or less, still more preferably 12 mgKOH/g or less, and yet still more preferably 10 mgKOH/g or less.

The hydroxyl value of the polyester resin is preferably 20 mgKOH/g or more, more preferably 30 mgKOH/g or more, and still more preferably 35 mgKOH/g or more from the viewpoints of exhibiting high adhesive strength to the aggregate and improving the dry strength, and it is preferably 50 mgKOH/g or less, and more preferably 45 mgKOH/g or less from the viewpoint of improving the dry strength and the strength after immersion in water.

The softening point of the polyester resin is preferably 95° C. or higher, more preferably 100° C. or higher, and it is preferably 170° C. or lower, more preferably 160° C. or lower from the viewpoints of exhibiting high adhesive strength to the aggregate and improving the dry strength, and it is still more preferably 150° C. or lower from the viewpoints of attaining excellent melt-dispersibility in asphalt and improving the dry strength.

The glass transition point of the polyester resin is preferably 50° C. or higher, more preferably 55° C. or higher from the viewpoint of improving the dry strength, and it is preferably 80° C. or lower, more preferably 70° C. or lower from the viewpoint of improving the dry strength.

From the viewpoint of improving the dry strength, the strength after immersion in water, and the strength after immersion in petroleum, the weight average molecular weight Mw of a soluble matter of the polyester resin in tetrahydrofuran (hereinafter also referred to as "THF"), as obtained by gel permeation chromatography (hereinafter also referred to as "GPC") measurement, is preferably 8,000 or more, more preferably 10,000 or more, still more preferably 15,000 or more, and yet still more preferably 20,000 or more, and it is preferably 500,000 or less, more preferably 300,000 or less, and still more preferably 200,000 or less.

From the viewpoint of improving the dry strength, the strength after immersion in water, and the strength after immersion in petroleum, the number average molecular weight Mn of a soluble matter of the polyester resin in THF, as obtained by GPC measurement, is preferably 1,000 or more, more preferably 2,000 or more, and still more preferably 2,500 or more, and it is preferably 20,000 or less, more preferably 10,000 or less, and still more preferably 5,000 or less.

From the viewpoint of improving the dry strength, the strength after immersion in water, and the strength after immersion in petroleum, the molecular weight distribution (Mw/Mn) of a soluble matter of the polyester resin in THF, as obtained by GPC measurement, is preferably 2 or more, more preferably 4 or more, and still more preferably 6 or more, and it is preferably 30 or less, more preferably 20 or less, and still more preferably 15 or less.

From the viewpoint of improving the dry strength, the strength after immersion in water, and the strength after immersion in petroleum, the content of an insoluble matter of the polyester resin in THF (hereinafter also referred to as "THF-insoluble matter") is preferably 5% by mass or more, more preferably 10% by mass or more, and still more preferably 20% by mass or more, and it is preferably 50% by mass or less, more preferably 45% by mass or less, and still more preferably 40% by mass or less.

The acid value, the hydroxyl value, the softening point, the glass transition point, the weight average molecular weight Mw, the number average molecular weight Mn, the molecular weight distribution (Mw/Mn) and the THF insoluble matter may be measured according to the methods described in the section of Examples.

It is to be noted that the acid value, the hydroxyl value, the softening point, and the glass transition point may be controlled by a raw material monomer composition, a molecular weight, a catalyst amount, or reaction conditions.

In addition, the polyester resin may be used alone or in combination of two or more thereof. In the case of using two or more thereof in combination, the softening point is a value determined by measuring a mixture containing two or more thereof by the method described in Examples.

(Production Method for Polyester Resin)

Although a method for producing the polyester resin is not particularly limited, for example, the polyester resin may be produced by subjecting the alcohol component and the carboxylic acid component as described above to polycondensation.

A blending amount of each of the alcohol component and the carboxylic acid component is a blending amount such that the molar ratio of the carboxylic acid component-derived constituent unit to the alcohol component-derived constituent unit [(carboxylic acid component)/(alcohol component)] falls with the foregoing numerical value range.

That is, as for the method for producing the polyester resin, the polyester resin may be, for example, produced by subjecting the alcohol component and the carboxylic acid component as described above to polycondensation in a blending amount such that the molar ratio of the carboxylic acid component-derived constituent unit to the alcohol component-derived constituent unit [(carboxylic acid component)/(alcohol component)] falls within the foregoing numerical value range.

From the viewpoint of reactivity, a temperature of the polycondensation reaction is preferably 160° C. or higher, more preferably 190° C. or higher, and still more preferably 220° C. or higher, and it is preferably 260° C. or lower, more preferably 250° C. or lower, and still more preferably 240° C. or lower.

Examples of an esterification catalyst which is used for the polycondensation reaction include titanium compounds and tin(II) compounds not having an Sn—C bond. These may be used alone or in combination of two or more thereof.

As the titanium compound, titanium compounds having a Ti—O bond are preferred, and titanium compounds having an alkoxy group, an alkenyloxy group, or an acyloxy group, each having 1 or more and 28 or less carbon atoms in total, are more preferred.

As the tin(II) compound not having an Sn—C bond, tin(II) compounds having an Sn—O bond and tin(II) compounds having an Sn—X (X represents a halogen atom) bond are preferably exemplified, with tin(II) compounds having an Sn—O bond being more preferred. Above all, tin(II) di(2-ethylhexanoate) is more preferred from the viewpoints of reactivity, control of molecular weight, and control of physical properties of composite resin.

From the viewpoint of reactivity, a use amount of the esterification catalyst is preferably 0.01 parts by mass or more, more preferably 0.1 parts by mass or more, and still more preferably 0.2 parts by mass or more, and it is preferably 1.5 parts by mass or less, more preferably 1.0 part by mass or less, and still more preferably 0.6 parts by mass or less, based on 100 parts by mass of a total amount of the alcohol component and the carboxylic acid component.

As an esterification promoter, pyrogallol compounds are preferred. Such a pyrogallol compound is a compound having a benzene ring in which three hydrogen atoms adjacent to each other are substituted with a hydroxy group, and examples thereof include pyrogallol, gallic acid, gallic acid esters, benzophenone derivatives, such as 2,3,4-trihydroxybenzophenone and 2,2',3,4-tetrahydroxybenzophenone, and catechin derivatives, such as epigallocatechin and epigallocatechin gallate. From the viewpoint of reactivity, gallic acid is preferred.

From the viewpoint of reactivity, the amount to be used of the esterification promoter is preferably 0.001 parts by mass or more, more preferably 0.005 parts by mass or more, and still more preferably 0.01 parts by mass or more, and it is preferably 0.15 parts by mass or less, more preferably 0.10 parts by mass or less, and still more preferably 0.05 parts by mass or less, based on 100 parts by mass of a total amount of the alcohol component and the carboxylic acid component.

[Melt-Kneading]

The polyester resin of the present invention is one subjected to melt-kneading. Through the melt-kneading, the polyester resin comes to have a broad molecular weight distribution, and therefore, an asphalt composition excellent in dry strength, strength after immersion in water, and strength after immersion in petroleum can be obtained.

The method for producing the polyester resin preferably includes at least the following step A-1, and more preferably includes the following step A-1 and step A-2.

Step A-1: Step of melt-kneading a raw material mixture containing a polyester resin Step A-2: Step of pulverizing the melt-kneaded product obtained in Step A-1

<Step A-1>

In Step A-1, the polyester resin is preferably melt-kneaded along with an additive such as pigments and waxes. The pigment (especially carbon black) dispersed at the time of melt-kneading is finely dispersed in the asphalt composition and acts as a filler, thereby improving the dry strength.

In the present invention, "melt-kneading" means that the resin is kneaded by a kneader at a temperature at which the resin has fluidity.

In addition, after mixing a raw material mixture with a mixer, such as a Henschel mixer and a ball mill, beforehand, the raw material mixture is preferably supplied to a kneader.

(Pigment)

The pigment is preferably dispersed in the polyester resin.

The pigment is not particularly limited and includes known pigments, and can be appropriately selected depending on the purpose. Specific examples of the pigment include various pigments such as carbon black, inorganic complex oxide, chrome yellow, Hansa yellow, benzidine yellow, Threne yellow, quinoline yellow, permanent orange GTR, pyrazolone orange, Vulcan orange, watch young red, permanent red, brilliant carmine 3B, brilliant carmine 6B, Dupont oil red, pyrazolone red, lithol red, rhodamine B lake, lake red C, bengal, aniline blue, ultramarine blue, chalco oil blue, methylene blue chloride, phthalocyanine blue, phthalocyanine green, and malachite green oxalate. These can be used alone or in combination of two or more thereof.

Among these, the pigment preferably contains carbon black.

From the viewpoint of improving the dry strength, the strength after immersion in water, and the strength after immersion in petroleum, the content of the pigment is preferably 3 parts by mass or more, more preferably 4 parts by mass or more, and still more preferably 5 parts by mass or more, and it is preferably 10 parts by mass or less, more preferably 8 parts by mass or less, and still more preferably 7 parts by mass or less based on 100 parts by mass of the polyester resin.

(Wax)

Waxes include low molecular weight polyolefins such as polyethylene, polypropylene and polybutene; silicone wax; fatty acid amides such as oleic acid amide and stearic acid amide; vegetable waxes such as carnauba wax, rice wax and candelilla wax; animal waxes such as beeswax; mineral-based or petroleum-based waxes such as montan wax, paraffin wax, and Fischer-Tropsch wax; and synthetic waxes such as ester wax. These waxes may be used alone or in combination of two or more thereof.

The amount of the wax is preferably 0.1 parts by mass or more, more preferably 0.5 parts by mass or more, and still more preferably 1 part by mass or more, and it is preferably 20 parts by mass or less, more preferably 15 parts by mass or less, and still more preferably 10 parts by mass or less based on 100 parts by mass of the polyester resin.

In addition, it is preferable that an aggregate is not included in the raw material mixture at the time of melt-kneading.

(Kneader)

Melt-kneading can be carried out using a known kneader such as a closed kneader, a kneading extruder such as a single-screw or twin-screw extruder, or an open roll kneader. Among these, a kneading extruder and an open roll kneader are preferable, a kneading extruder is more preferable, and a twin screw extruder is still more preferable.

Twin screw extruders generally have a closed type construction with two screws in the barrel. In the twin screw extruder, usually, any or all of the parts corresponding to the feeding part, the compression part, and the metering part of the screw may be equipped with a heater, and it is possible to heat the barrel of the parts corresponding to the feeding part, the compression part, and the metering part to adjust the barrel temperature (temperature of the inner wall surface of the twin screw extruder). The melt-kneading temperature may be adjusted by adjusting the barrel temperature.

(Melt-Kneading Conditions)

The kneading temperature for melt-kneading is, from the viewpoint of improving the dry strength, the strength after immersion in water, and the strength after immersion in petroleum, preferably 90° C. or higher and more preferably 100° C. or higher, and it is preferably 140° C. or lower and more preferably 120° C. or lower. When a twin screw extruder is used, the kneading temperature is the barrel temperature.

When a twin screw extruder is used, the rotational speed of rotation of the screw is, from the viewpoint of improving the dry strength, the strength after immersion in water, and the strength after immersion in petroleum, preferably 50 r/min or more, more preferably 100 r/min or more, and still more preferably 150 r/min or more, and it is preferably 400 r/min or less, more preferably 300 r/min or less, and still more preferably 250 r/min or less.

The feed rate of the mixture to the twin screw extruder is appropriately adjusted according to the capacity of the kneader used and the above-mentioned barrel temperature and rotational speed of rotation of the screw.

From the viewpoint of improving the dry strength, the strength after immersion in water, and the strength after immersion in petroleum, Step A-1 is preferably a step of melt-kneading the polyester resin until the polyester resin after melt-kneading has a softening point lower than that of the polyester resin before melt-kneading by 5° C. or higher and 40° C. or lower to obtain a polyester resin having a softening point of 90° C. or higher and 150° C. or lower.

In Step A-1, the softening point of the polyester resin is preferably lower than that of the polyester resin before melt-kneading by preferably 5° C. or higher, more preferably 8° C. or higher, and still more preferably 10° C. or higher, and preferably 40° C. or lower, more preferably 30° C. or lower, and still more preferably 20° C. or lower, from the viewpoint of improving the dry strength, the strength after immersion in water, and the strength after immersion in petroleum.

From the viewpoint of improving the dry strength, the strength after immersion in water, and the strength after immersion in petroleum, Step A-1 is preferably a step of melt-kneading the polyester resin until the weight average molecular weight Mw of a soluble matter in THF of the polyester resin, as obtained by GPC measurement, is increased such that that of the polyester resin after melt-kneading is at least 2 times and not more than 100 times that of the polyester resin before melt-kneading. It is considered that the kneading enables the high molecular weight component in the polyester resin to be easily dissolved in THF, so that the weight average molecular weight Mw by GPC is increased.

The weight average molecular weight Mw of the polyester resin obtained in Step A-1 is preferably 2 times or more, more preferably 3 times or more, and still more preferably 4 times or more, and preferably 100 times or less, more preferably 80 times or less, even more preferably 40 times or less, still more preferably 20 times or less, and yet still more preferably 10 times or less that of the polyester resin before melt-kneading, from the viewpoint of improving the dry strength, the strength after immersion in water, and the strength after immersion in petroleum.

From the viewpoint of improving the dry strength, the strength after immersion in water, and the strength after immersion in petroleum, Step A-1 is preferably a step of melt-kneading the polyester resin until the molecular weight distribution (Mw/Mn) of a soluble matter of the polyester resin after melt-kneading in THF is at least 2 times and not more than 100 times that of the polyester resin before melt-kneading, as obtained by GPC measurement.

The molecular weight distribution (Mw/Mn) of the polyester resin obtained in Step A-1 is preferably 2 times or more, more preferably 3 times or more, and still more preferably 4 times or more, and preferably 80 times or less, more preferably 40 times or less, still more preferably 20 times or less, and yet still more preferably 10 times or less that of the polyester resin before melt-kneading, from the viewpoint of improving the dry strength, the strength after immersion in water, and the strength after immersion in petroleum.

(Physical Properties of Polyester Resin after Melt-Kneading)

The physical properties of the polyester resin after melt-kneading are described below.

The acid value of the polyester resin is preferably 2 mgKOH/g or more, more preferably 3 mgKOH/g or more, and still more preferably 3.5 mgKOH/g or more, and it is preferably 30 mgKOH/g or less, more preferably 15 mgKOH/g or less, still more preferably 12 mgKOH/g or less, and yet still more preferably 10 mgKOH/g or less.

The hydroxyl value of the polyester resin is preferably 20 mgKOH/g or more, more preferably 30 mgKOH/g or more, and still more preferably 35 mgKOH/g or more from the viewpoints of exhibiting high adhesive strength to the aggregate and improving the dry strength, and it is preferably 50 mgKOH/g or less and more preferably 45 mgKOH/g or less from the viewpoint of improving the dry strength and the strength after immersion in water.

The softening point of the polyester resin is preferably 90° C. or higher, more preferably 95° C. or higher, and still more preferably 100° C. or higher, and preferably 150° C. or lower and more preferably 140° C. or lower from the viewpoints of exhibiting high adhesive strength to the aggregate and improving the dry strength. It is still more preferably 130° C. or lower from the viewpoints of showing excellent melt dispersion to asphalt and improving the dry strength.

The softening point of the polyester resin after melt-kneading is lower than that of the polyester resin before melt-kneading is preferably 5° C. or higher, more preferably 8° C. or higher, and still more preferably 10° C. or higher, and preferably 40° C. or lower, more preferably 30° C. or lower, and still more preferably 20° C. or lower, from the viewpoint of improving the dry strength, the strength after immersion in water, and the strength after immersion in petroleum.

The glass transition point of the polyester resin is preferably 50° C. or higher and more preferably 55° C. or higher from the viewpoint of improving the dry strength, and it is preferably 80° C. or lower and more preferably 70° C. or lower from the viewpoint of improving the dry strength.

From the viewpoint of improving the dry strength, the strength after immersion in water, and the strength after immersion in petroleum, the weight average molecular weight Mw of the polyester resin is preferably 10,000 or more, more preferably 20,000 or more, still more preferably 30,000 or more, and yet still more preferably 50,000 or more, and it is preferably 500,000 or less, more preferably 300,000 or less, and still more preferably 200,000 or less.

From the viewpoint of improving the dry strength, the strength after immersion in water, and the strength after immersion in petroleum, the weight average molecular weight Mw of a soluble matter of the polyester resin in THF, as obtained by GPC measurement, is preferably 2 times or more, more preferably 3 times or more, and still more preferably 4 times or more, and preferably 100 times or less, more preferably 80 times or less, even more preferably 40 times or less, still more preferably 20 times or less, and yet still more preferably 10 times or less that of the resin before melt-kneading.

From the viewpoint of improving the dry strength, the strength after immersion in water, and the strength after immersion in petroleum, the number average molecular weight Mn of the polyester resin is preferably 1,000 or more, more preferably 2,000 or more, and still more preferably 2,500 or more, and it is preferably 20,000 or less, more preferably 10,000 or less, and still more preferably 5,000 or less.

From the viewpoint of improving the dry strength, the strength after immersion in water, and the strength after immersion in petroleum, the molecular weight distribution (Mw/Mn) of the polyester resin is preferably 2 or more, more preferably 4 or more, even more preferably 10 or more, still more preferably 20 or more, and yet still more preferably 30 or more, and it is preferably 100 or less, more preferably 80 or less, and still more preferably 60 or less.

From the viewpoint of improving the dry strength, the strength after immersion in water, and the strength after immersion in petroleum, the content of THF-insoluble matter of the polyester resin after melt-kneading is preferably 10% by mass or less, more preferably 5% by mass or less, and still more preferably 1% by mass or less, and it is preferably 0% by mass or more, and more preferably 0% by mass.

The acid value, the hydroxyl value, the softening point, the glass transition point, the weight average molecular weight Mw, the number average molecular weight Mn, the molecular weight distribution (Mw/Mn) and the THF insoluble matter may be measured according to the methods described in the section of Examples.

It is to be noted that the acid value, the hydroxyl value, the softening point, and the glass transition point may be controlled by a raw material monomer composition, a molecular weight, a catalyst amount, or reaction conditions.

In addition, the polyester resin may be used alone or in combination of two or more thereof. In the case of using two or more thereof in combination, the softening point is a value determined by measuring a mixture containing two or more thereof by the method described in Examples.

The melt-kneaded product obtained in Step A-1 may be subjected to the subsequent Step A-2 after being cooled to such an extent that pulverizing is possible.

<Step A-2>

In Step A-2, the melt-kneaded product obtained in Step A-1 is pulverized.

The pulverization step may be divided into multiple stages. For example, the resin-kneaded product obtained by hardening the melt-kneaded product may be coarsely pulverized to about 1 to 5 mm and then finely pulverized to a desired particle size.

The pulverizer used for the pulverization step is not specifically limited. For example, as a pulverizer suitably used for coarse pulverizing, a hammer mill, an atomizer, Rotoplex, etc. are mentioned. Moreover, as a pulverizer suitably used for pulverization, a fluidized bed jet mill, a collision plate jet mill, a rotary mechanical mill, etc. are mentioned. From the viewpoint of pulverizing efficiency, a fluidized bed jet mill or a collision plate type jet mill is preferable, and a fluidized bed jet mill is more preferable.

With respect to a pulverizer useful for pulverization, commercially available products thereof include "SF-1" manufactured by Sanriki Seisakusho Co., Ltd.

After the pulverization step, a classification step may be further provided.

As a classifier used for the classification step, a rotor type classifier, an air flow type classifier, an inertial type classifier, a sieve type classifier, etc. are mentioned, for example. In the classification step, if the pulverization is insufficient, it may be subjected to the pulverization step again, and the pulverization step and the classification step may be repeated as necessary.

An external additive may be added to the polyester resin particles in order to improve the flowability and the like. As the external additive, inorganic fine particles such as surface-hydrophobicized silica fine particles, titanium oxide fine particles, alumina fine particles, cerium oxide fine particles, and carbon black; polymer fine particles such as polycarbonate, polymethyl methacrylate, and silicone resin may be used.

The number average particle diameter of the external additive is preferably 4 nm or more, more preferably 8 nm or more, and still more preferably 12 nm or more, and it is preferably 200 nm or less, more preferably 50 nm or less, and still more preferably 30 nm or less from the viewpoint of fluidity.

The addition amount of the external additive is preferably 0.1 parts by mass or more, more preferably 0.5 parts by mass or more, and still more preferably 1 part by mass or more, and it is preferably 5 parts by mass or less, more preferably 4 parts by mass or less, and still more preferably 3 parts by mass or less, based on 100 parts by mass of the resin particles before treatment, from the viewpoint of enhancing the fluidity of the polyester resin particles.

[Average Particle Diameter of Polyester Resin Particle]

The polyester resin is preferably a polyester resin particle.

An average particle diameter of the polyester resin particle is preferably 1 μm or more, more preferably 2 μm or more, and still more preferably 3 μm or more, and it is preferably 10 mm or less and more preferably 2 mm or less from the viewpoints of enhancing the dispersibility of the resin and improving the dry strength. More preferably, it is preferably 20 μm or less, more preferably 15 μm or less, and still more preferably 10 μm or less from the viewpoints of increasing the dispersibility of the resin and improving the dry strength. When the average particle diameter of the polyester resin particle is 1 μm or more and 20 μm or less, they are finely dispersed at the time of mixing and melting with asphalt, the time for entanglement (adsorption) to aggregates becomes short, and the dry strength is improved.

It is to be noted that the average particle diameter is a value measured in conformity with the prescription of HS Z8815. Specifically, a sample is sieved using seven sieves having openings of 2,830 μm, 2,000 μm, 1,400 μm, 850 μm, 600 μm, 425 μm, and 106 μm. The average particle diameter is defined as a weighted average particle diameter calculated based on the weight of the sample remaining on each sieve.

The polyester resin particles may be, for example, toners for electrophotography and fine particles and coarse particles produced in the toner production process.

[Ratio of Polyester Resin]

From the viewpoint of improving the dry strength, a ratio of the polyester resin is 5 parts by mass or more, preferably 8 parts by mass or more, more preferably 10 parts by mass or more, and still more preferably 15 parts by mass or more, and it is 50 parts by mass or less, preferably 40 parts by mass or less, and more preferably 30 parts by mass or less, based on 100 parts by mass of the asphalt.

[Asphalt]

As the asphalt used in the present invention, for example, various kinds of asphalts may be used. For example, in addition to straight asphalt which is petroleum asphalt for paving, modified asphalt is mentioned.

Straight asphalt is a residual bituminous substance obtained by applying crude oil to an atmospheric distillation apparatus, a vacuum distillation apparatus or the like.

Examples of the modified asphalt include blown asphalt; asphalt modified with a polymeric material such as a thermoplastic elastomer and a thermoplastic resin.

Examples of the thermoplastic elastomer include styrene/butadiene/block copolymer (SBS), styrene/isoprene/block copolymer (SIS), and ethylene/vinyl acetate copolymer (EVA).

Examples of the thermoplastic resin include ethylene/vinyl acetate copolymer, ethylene/ethyl acrylate copolymer, polyethylene, and polypropylene.

Among these, straight asphalt is preferable.

The penetration of asphalt, particularly straight asphalt, is preferably more than 40, and it is preferably 120 or less, more preferably 80 or less, and still more preferably 60 or less. The measurement method of the penetration is according to the method defined in JIS K 2207. It is to be noted that under the test conditions described in JIS K 2207, a length of 0.1 mm in which a specified needle vertically enters the sample is represented as 1.

The content of asphalt in the asphalt composition is preferably 2% by mass or more and more preferably 3% by mass or more, and it is preferably 15% by mass or less, more preferably 10% by mass or less, and still more preferably 8% by mass or less.

[Aggregate]

The asphalt composition of the present invention contains an aggregate.

The aggregate may be, for example, arbitrarily selected from crushed stone, cobble stone, gravel, sand, reclaimed aggregate, and ceramics, used.

As the aggregate, any of a coarse aggregate having a particle diameter of 2.36 mm or more and a fine aggregate having a particle diameter of less than 2.36 mm may be used. Examples of the coarse aggregate include No. 7 crushed stone having particle diameter range of 2.36 mm or more and 4.75 mm or less, No. 6 crushed stone having particle diameter range of 4.75 mm or more and 13.2 mm or less, No. 5 crushed stone having particle diameter range of 13.2 mm or more and 19 mm or less, and No. 4 crushed stone having particle diameter range of 19 mm or more and 31.5 mm or less.

The fine aggregate is preferably a fine aggregate having particle diameter of 0.075 mm or more and less than 2.36 mm.

Examples of the fine aggregate include river sand, hill sand, mountain sand, sea sand, crushed sand, fine sand, screenings, crushed stone dust, silica sand, artificial sand, glass cullet, molding sand, and recycled aggregate-crushed sand.

The particle diameter is a value defined in HS 5001-1995.

Of these, a combination of coarse aggregate and fine aggregate is preferred.

The fine aggregate may include a filler having a particle diameter of less than 0.075 mm (for example, sand). The lower limit of the average particle diameter of the filler is, for example, 0.001 mm or more.

The average particle diameter of the filler is preferably 0.001 mm or more, and it is preferably 0.05 mm or less, more preferably 0.03 mm or less, and still more preferably 0.02 mm or less from the viewpoints of improving the dry strength. The average particle diameter of the filler can be measured by laser diffraction particle size analyzers. Here, the average particle diameter means an average particle diameter of 50% cumulative volume.

[Measurement Method for Average Particle Diameter of Filler]

The average particle diameter of the filler is a value measured by a laser diffraction particle size analyzer (LA-950, manufactured by HORIBA, Ltd.) under the following condition.

Measurement Method: Flow method
Dispersion Media: Ethanol
Sample Preparation: 2 mg/100 mL
Dispersing Method: Stirring with built-in ultrasonic waves for 1 minute Examples of the filler include sand, fly ash, calcium carbonate and hydrated lime. Of these, calcium carbonate is preferable from the viewpoint of improving the dry strength.

The mass ratio of the coarse aggregate to the fine aggregate is preferably 10/100 or more, more preferably 20/100 or more, and still more preferably 30/100 or more, and it is preferably 90/100 or less, more preferably 80/100 or less, and still more preferably 70/100 or less.

The content of the aggregate is preferably 1,000 parts by mass or more, more preferably 1,200 parts by mass or more, and still more preferably 1,500 parts by mass or more, and it is preferably 3,000 parts by mass or less, more preferably 2,500 parts by mass or less, and still more preferably 2,000 parts by mass or less, based on 100 parts by mass of the total amount of the asphalt and the polyester resin.

Suitable blending examples of the asphalt composition of the present invention are as follows.

(1) An example of the asphalt composition contains, for example, 30% by volume or more and less than 45% by volume of the coarse aggregate, 30% by volume or more and 50% by volume or less of the fine aggregate, and 5% by volume or more and 10% by volume or less of the asphalt and the polyester resin (fine-graded asphalt).

(2) An example of the asphalt composition contains, for example, 45% by volume or more and less than 70% by volume of the coarse aggregate, 20% by volume or more and 45% by volume or less of the fine aggregate, and 3% by volume or more and 10% by volume or less of the asphalt and the polyester resin (dense-graded asphalt).

(3) An example of the asphalt composition contains, for example, 70% by volume or more and 80% by volume or less of the coarse aggregate, 10% by volume or more and 20% by volume or less of the fine aggregate, and 3% by volume or more and 10% by volume or less of the asphalt and the polyester resin (porous asphalt).

In the present invention, other components may be further blended, if desired.

It is to be noted that the blending ratio of asphalt in the conventional asphalt compositions containing an aggregate and the asphalt may be in general determined by referring to an optimum asphalt amount obtained from "Formulation and Design of Asphalt Mixture" as described in "Guideline for Pavement Design and Construction" published by Japan Road Association.

In the present invention, the above-described optimum asphalt amount corresponds to the total amount of the asphalt and the polyester resin. In consequence, in general, the total amount of the asphalt and the polyester resin blended in the asphalt composition is preferably set to the above-described optimum asphalt amount.

However, the method is not particularly limited to the method as described in "Guideline for Pavement Design and Construction", and it may be acceptable to determine by any other methods.

[Production Method for Asphalt Composition]

The asphalt composition of the present invention may be used in the form of a heated asphalt composition not substantially containing water, or may also be used in the form of a cold asphalt mixture which is an asphalt emulsion prepared by blending the above-described asphalt composition with an emulsifier or water.

In particular, with respect to the asphalt composition of the present invention, the polyester resin is apt to be uniformly dispersed in the asphalt composition. Therefore, when the asphalt composition of the present invention is used in the form of a heated asphalt composition, it is able to effectively exhibit its characteristic features.

In the case of using the asphalt composition of the present invention in the form of a heated asphalt composition, the method for producing the asphalt composition is not particularly limited, and the asphalt composition may be produced by any methods. In general, the asphalt composition of the present invention may be produced according to any method for producing an asphalt composition containing an aggregate and asphalt.

[Step 1]

The method for producing the asphalt composition of the present invention preferably includes a step of mixing the asphalt, the polyester resin, and the aggregate at 130° C. or higher and 200° C. or lower (hereinafter also referred to as "Step 1").

The mixing temperature in Step 1 is preferably a temperature higher than the softening point of the polyester resin. Specifically, the mixing temperature is preferably 140° C. or higher, and it is preferably 190° C. or lower, and more preferably 180° C. or lower.

The mixing time in Step 1 is preferably 30 seconds or more. Although the upper limit of the mixing time in Step 1 is not particularly limited, it is, for example, about 30 minutes or so.

As the specific production method, there may be used the conventional method for production of asphalt compositions which is known as a so-called plant mix (premix) method in which, in the step of mixing an aggregate with asphalt, the polyester resin may be charged together with asphalt. However, in this case, in order to melt the polyester resin, it is preferred to previously make the temperature of the aggregate higher than that usually used.

In addition, the asphalt and the polyester resin may be previously mixed while stirring at a high temperature, for example, 130° C. or higher (preferably 150° C. or higher), and then the resulting mixture may be charged (premix method).

[Road Paving Method]

The asphalt composition of the present invention is used for road pavement.

[Step 2]

The road paving method of the present invention preferably includes a step of laying the asphalt composition of the present invention, thereby forming an asphalt paving material layer (hereinafter also referred to as "Step 2").

It is to be noted that in Step 2, the asphalt composition of the present invention may be subjected to compacting laying by the same method using the same formation of the laying machines as used for ordinary asphalt compositions. In the case of using the asphalt composition in the form of a heated asphalt composition, a compacting temperature thereof is preferably higher than the softening point of the polyester resin. The compacting temperature is preferably 100° C. or higher, more preferably 120° C. or higher, and still more preferably 130° C. or higher, and it is preferably 200° C. or lower, more preferably 180° C. or lower, and still more preferably 170° C. or lower.

With respect to the above-described embodiments, the present invention further discloses the following asphalt composition for road pavement, a method for producing the same, and road paving method.

<1> An asphalt composition for road pavement, containing asphalt, a polyester resin, and an aggregate, wherein the polyester resin is one subjected to melt-kneading and a ratio of the polyester resin is 5 parts by mass or more and 50 parts by mass or less based on 100 parts by mass of the asphalt.

<2> The asphalt composition for road pavement as set forth in <1>, wherein an alcohol component of the polyester resin contains 50 mol % or more of an alkylene oxide adduct of bisphenol A.

<3> The asphalt composition for road pavement as set forth in <2>, wherein the alkylene oxide adduct of bisphenol A is preferably a propylene oxide adduct of bisphenol A or an ethylene oxide adduct of bisphenol A, and more preferably a combination of the propylene oxide adduct of bisphenol A and the ethylene oxide adduct of bisphenol A.

<4> The asphalt composition for road pavement as set forth in <2> or <3>, wherein an amount of the alkylene oxide adduct of bisphenol A in an alcohol component is preferably 50 mol % or more, more preferably 65 mol % or more, still more preferably 80 mol % or more, and yet still more preferably 90 mol % or more, and it is preferably 100 mol % or less, and more preferably 100 mol %.

<5> The asphalt composition for road pavement as set forth in any one of <2> to <4>, wherein a molar ratio of the propylene oxide adduct of bisphenol A to the ethylene oxide adduct of bisphenol A is preferably 10/90 or more, more preferably 20/80 or more, and still more preferably 30/70 or more, and it is preferably 70/30 or less, more preferably 60/40 or less, and still more preferably 55/45 or less.

<6> The asphalt composition for road pavement as set forth in any one of <1> to <5>, wherein a carboxylic acid component of the polyester resin preferably contains one or more selected from the group consisting of terephthalic acid, isophthalic acid, fumaric acid and maleic acid, more preferably contains one or more selected from the group consisting of terephthalic acid and fumaric acid, and still more preferably contains terephthalic acid.

<7> The asphalt composition for road pavement as set forth in any one of <1> to <6>, wherein the melt-kneading is performed by using preferably a kneader, more preferably a closed kneader, a kneading extruder such as a single-screw or twin-screw extruder, an open roll kneader, even more preferably a kneading extruder, an open roll kneader, still more preferably a kneading extruder, and yet still more preferably a twin screw extruder.

<8> The asphalt composition for road pavement as set forth in any one of <1> to <7>, wherein a kneading temperature of the melt-kneading is preferably 90° C. or higher, and more preferably 100° C. or higher, and it is preferably 140° C. or lower, and more preferably 120° C. or lower.

<9> The asphalt composition for road pavement as set forth in any one of <1> to <8>, wherein a twin screw extruder is used in the melt-kneading, and a rotational speed of rotation of the screw is preferably 50 r/min or more, more preferably 100 r/min or more, and still more preferably 150 r/min or more, and it is preferably 400 r/min or less, more preferably 300 r/min or less, and still more preferably 250 r/min or less.

<10> The asphalt composition for road pavement as set forth in any one of <1> to <9>, wherein the melt-kneading is a step of melt-kneading the polyester resin until the polyester resin after melt-kneading has a softening point lower than that of the polyester resin before melt-kneading by 5° C. or higher and 40° C. or lower to obtain a polyester resin having a softening point of 90° C. or higher and 150° C. or lower.

<11> The asphalt composition for road pavement as set forth in <10>, wherein the melt-kneading is performed until the polyester resin after melt-kneading has a softening point lower than that of the polyester resin before melt-kneading by preferably 5° C. or higher, more preferably 8° C. or higher, and still more preferably 10° C. or higher, and preferably 40° C. or lower, more preferably 30° C. or lower, and still more preferably 20° C. or lower.

<12> The asphalt composition for road pavement as set forth in any one of <1> to <11>, wherein the melt-kneading is a step of melt-kneading the polyester resin until the weight average molecular weight Mw of a soluble matter of the polyester resin in THF, as obtained by GPC measurement, is at least 2 times and not more than 100 times that of the polyester resin before melt-kneading.

<13> The asphalt composition for road pavement as set forth in <12>, wherein the melt-kneading is performed until the weight average molecular weight Mw of the polyester resin after melt-kneading is preferably 2 times or more, more preferably 3 times or more, and still more preferably 4 times or more, and preferably 100 times or less, more preferably 80 times or less, even more preferably 40 times or less, still more preferably 20 times or less, and yet still more preferably 10 times or less that of the polyester resin before melt-kneading.

<14> The asphalt composition for road pavement as set forth in any one of <1> to <13>, wherein the melt-kneading is a step of melt-kneading the polyester resin until the molecular weight distribution (Mw/Mn) of a soluble matter in THF of the polyester resin after melt-kneading is at least 2 times and not more than 100 times that of the polyester resin before melt-kneading.

<15> The asphalt composition for road pavement as set forth in <14>, wherein the melt-kneading is performed until the molecular weight distribution (Mw/Mn) of the polyester resin is preferably 2 times or more, more preferably 3 times or more, and still more preferably 4 times or more, and preferably 80 times or less, more preferably 40 times or less, still more preferably 20 times or less, and yet still more preferably 10 times or less that of the polyester resin before melt-kneading.

<16> The asphalt composition for road pavement as set forth in any one of <1> to <15>, wherein an acid value of the polyester resin after melt-kneading is preferably 2 mgKOH/g or more, more preferably 3 mgKOH/g or more, and still more preferably 3.5 mgKOH/g or more, and it is preferably 30 mgKOH/g or less, more preferably 15 mgKOH/g or less, still more preferably 12 mgKOH/g or less, and yet still more preferably 10 mgKOH/g or less.

<17> The asphalt composition for road pavement as set forth in any one of <1> to <16>, wherein a hydroxyl value of the polyester resin after melt-kneading is preferably 20 mgKOH/g or more, more preferably 30 mgKOH/g or more, and still more preferably 35 mgKOH/g or more, and it is preferably 50 mgKOH/g or less, and more preferably 45 mgKOH/g or less.

<18> The asphalt composition for road pavement as set forth in any one of <1> to <17>, wherein a softening point of the polyester resin after melt-kneading is preferably 90° C. or higher, more preferably 95° C. or higher, and still more preferably 100° C. or higher, and it is preferably 150° C. or lower, more preferably 140° C. or lower, and still more preferably 130° C. or lower.

<19> The asphalt composition for road pavement as set forth in any one of <1> to <18>, wherein the softening point of the polyester resin after melt-kneading is lower than that of the polyester resin before melt-kneading by preferably 5° C. or higher, more preferably 8° C. or higher, and still more preferably 10° C. or higher, and preferably 40° C. or lower, more preferably 30° C. or lower, and still more preferably 20° C. or lower.

<20> The asphalt composition for road pavement as set forth in any one of <1> to <19>, wherein a glass transition point of the polyester resin after melt-kneading is preferably 50° C. or higher, and more preferably 55° C. or higher, and it is preferably 80° C. or lower, and more preferably 70° C. or lower.

<21> The asphalt composition for road pavement as set forth in any one of <1> to <19>, wherein a weight average molecular weight Mw of the polyester resin after melt-kneading is preferably 10,000 or more, more preferably 20,000 or more, still more preferably 30,000 or more, and yet still more preferably 50,000 or more, and it is preferably 500,000 or less, more preferably 300,000 or less, and still more preferably 200,000 or less.

<22> The asphalt composition for road pavement as set forth in any one of <1> to <21>, wherein the weight average molecular weight Mw of a soluble matter in THF of the polyester resin after melt-kneading, as obtained by GPC measurement, is preferably 2 times or more, more preferably 3 times or more, and still more preferably 4 times or more, and preferably 100 times or less, more preferably 80 times or less, even more preferably 40 times or less, still more preferably 20 times or less, and yet still more preferably 10 times or less that of the polyester resin before melt-kneading.

<23> The asphalt composition for road pavement as set forth in any one of <1> to <22>, wherein a number average molecular weight Mn of the polyester resin after melt-kneading is preferably 1,000 or more, more preferably 2,000 or more, and still more preferably 2,500 or more, and it is preferably 20,000 or less, more preferably 10,000 or less, and still more preferably 5,000 or less.

<24> The asphalt composition for road pavement as set forth in any one of <1> to <23>, wherein a molecular weight distribution (Mw/Mn) of the polyester resin after melt-kneading is preferably 2 or more, more preferably 4 or more, even more preferably 10 or more, still more preferably 20 or more, and yet still more preferably 30 or more, and it is preferably 100 or less, more preferably 80 or less, and still more preferably 60 or less.

<25> The asphalt composition for road pavement as set forth in any one of <1> to <24>, wherein a THF insoluble matter of the polyester resin after melt-kneading is preferably 10% by mass or less, more preferably 5% by mass or less, and still more preferably 1% by mass or less, and it is preferably 0% by mass or more, and more preferably 0% by mass.

<26> The asphalt composition for road pavement as set forth in any one of <1> to <25>, wherein the polyester resin is composed of a polyester resin particle having an average particle diameter of 1 μm or more and 20 μm or less blended therein.

<27> The asphalt composition for road pavement as set forth in any one of <1> to <26>, wherein an average particle diameter of the polyester resin particle is preferably 1 μm or more, more preferably 2 μm or more, and still more preferably 3 μm or more, and it is preferably 10 mm or less, more preferably 2 mm or less, even more preferably 20 μm or less, still more preferably 15 μm or less, and yet still more preferably 10 μm or less.

<28> The asphalt composition for road pavement as set forth in any one of <1> to <27>, wherein a ratio of the polyester resin is 5 parts by mass or more, preferably 8 parts by mass or more, more preferably 10 parts by mass or more, and still more preferably 15 parts by mass or more, and it is 50 parts by mass or less, preferably 40 parts by mass or less, and more preferably 30 parts by mass or less, based on 100 parts by mass of the asphalt.

<29> The asphalt composition for road pavement as set forth in any one of <1> to <28>, wherein the asphalt is straight asphalt.

<30> The asphalt composition for road pavement as set forth in any one of <1> to <29>, wherein a content of the asphalt in the asphalt composition is preferably 2% by mass or more, and more preferably 3% by mass or more, and it is preferably 15% by mass or less, more preferably 10% by mass or less, and still more preferably 8% by mass or less.

<31> The asphalt composition for road pavement as set forth in any one of <1> to <30>, wherein a content of the aggregate is preferably 1,000 parts by mass or more, more preferably 1,200 parts by mass or more, and still more preferably 1,500 parts by mass or more, and it is preferably 3,000 parts by mass or less, more preferably 2,500 parts by mass or less, and still more preferably 2,000 parts by mass or less, based on 100 parts by mass of a sum total of the asphalt and the polyester resin.

<32> The asphalt composition for road pavement as set forth in any one of <1> to <31>, further containing 3 parts by mass or more and 10 parts by mass or less of a pigment based on 100 parts by mass of the polyester resin.

<33> The asphalt composition for road pavement as set forth in <32>, wherein the pigment preferably contains carbon black.

<34> The asphalt composition for road pavement as set forth in <32> or <33>, wherein a content of the pigment is preferably 3 parts by mass or more, more preferably 4 parts by mass or more, and still more preferably 5 parts by mass or more, and it is preferably 10 parts by mass or less, more preferably 8 parts by mass or less, and still more preferably 7 parts by mass or less based on 100 parts by mass of the polyester resin.

<35> The asphalt composition for road pavement as set forth in any one of <1> to <34>, which is obtained by mixing the asphalt, the polyester resin, and the aggregate at 130° C. or higher and 200° C. or lower.

<36> The asphalt composition for road pavement as set forth in any one of <1> to <35>, which is obtained by mixing the asphalt, the polyester resin, and the aggregate at 130° C. or higher and 200° C. or lower.

<37> A method for producing an asphalt composition for road pavement, including a step of mixing asphalt, a polyester resin, and an aggregate at 130° C. or higher and 200° C. or lower, wherein the polyester resin used in the mixing step is one subjected to melt-kneading, and a ratio of the polyester resin is 5 parts by mass or more and 50 parts by mass or less based on 100 parts by mass of the asphalt.

<38> The method for producing an asphalt composition for road pavement as set forth in
<37>, wherein the polyester resin is a polyester having an alcohol component-derived constituent unit containing 50 mol % or more of an alkylene oxide adduct of bisphenol A and a carboxylic acid component-derived constituent unit containing 50 mol % or more of at least one selected from the group consisting of terephthalic acid and isophthalic acid and has a softening point of 90° C. or higher and 140° C. or lower and a hydroxyl value of 20 mgKOH/g or more and 50 mgKOH/g or less.

<39> The method for producing an asphalt composition for road pavement as set forth in
<37> or <38>, wherein the asphalt is straight asphalt.

<40> The method for producing an asphalt composition for road pavement as set forth in any one of <37> to <39>, wherein the polyester resin used in the mixing step is a polyester resin particle having an average particle diameter of 1 μm or more and 20 μm or less.

<41> The method for producing an asphalt composition for road pavement as set forth in any one of <37> to <40>, further including a step of melt-kneading a raw material mixture containing the polyester resin before the mixing step.

<42> The method for producing an asphalt composition for road pavement as set forth in
<41>, wherein the melt-kneading step is a step of melt-kneading the polyester resin until the polyester resin has a softening point lower than that of the polyester resin before melt-kneading by 5° C. or higher and 40° C. or lower to obtain a polyester resin having a softening point of 90° C. or higher and 140° C. or lower.

<43> The method for producing an asphalt composition for road pavement as set forth in any one of <37> to <42>, wherein the melt-kneading step is a step of melt-kneading the polyester resin until the weight average molecular weight Mw of a soluble matter in tetrahydrofuran of the polyester resin after melt-kneading is at least 2 times and not more than 100 times that of the polyester resin before melt-kneading, as obtained by gel permeation chromatography measurement.

<44> A road paving method including a step of laying an asphalt composition obtained by the method as set forth in any one of <37> to <43>, thereby forming an asphalt paving material layer.

<45> An asphalt composition for road pavement, including asphalt, and a polyester resin, wherein the polyester resin is one subjected to melt-kneading and a ratio of the polyester resin is 5 parts by mass or more and 50 parts by mass or less based on 100 parts by mass of the asphalt.

<46> Use of the asphalt composition as set forth in any one of <1> to <36> and <45> for road pavement.

EXAMPLES

Values of physical properties of resins and others were measured and evaluated by the following methods.

[Acid Value and Hydroxyl Value of Polyester Resin]

An acid value and a hydroxyl value of a polyester resin were measured on the basis of the method of JIS K0070. However, only the measuring solvent was changed from a mixed solvent of ethanol and ether as prescribed in JIS K0070 to a mixed solvent of acetone and toluene (acetone/toluene=1/1 (volume ratio)).

[Softening Point and Glass Transition Point of Polyester Resin]

(1) Softening Point:

Using a flow tester "CFT-500D" (manufactured by Shimadzu Corporation), while heating 1 g of a sample at a temperature rise rate of 6° C./min, a load of 1.96 MPa was applied by a plunger, and the sample was extruded through a nozzle having a diameter of 1 mm and a length of 1 mm. The amount of descent of the plunger of the flow tester versus the temperature was plotted, and a temperature at which a half amount of the sample flowed out was defined as the softening point of the sample.

(2) Maximum Endothermic Peak Temperature:

Using a differential scanning calorimeter "Q-100" (manufactured by TA Instruments Japan Inc.), a sample which had been cooled from room temperature (25° C.) to 0° C. at a temperature drop rate of 10° C./min was kept at that temperature for one minute, and thereafter, the resulting sample was measured while raising the temperature to 180° C. at a temperature rise rate of 10° C./min. Among observed endothermic peaks, a temperature of the peak existent on the highest temperature side was defined as the maximum endothermic peak temperature of the sample.

(3) Glass Transition Point:

Using a differential scanning calorimeter "Q-100" (manufactured by TA Instruments Japan Inc.), 0.01 to 0.02 g of a sample was weighed in an aluminum pan, subjected to temperature rise to 200° C., and then cooled from that temperature to 0° C. at a temperature drop rate of 10° C./min. Subsequently, the resulting sample was measured while raising the temperature to 150° C. at a temperature rise rate of 10° C./min. A temperature at which an extension of a baseline of not higher than the maximum endothermic peak temperature was intersected with a tangential line having a maximum inclination of the curve in a region of from a rise-up portion of the peak to an apex of the peak was read as the glass transition point of the sample.

[Weight Average Molecular Weight Mw, Number Average Molecular Weight Mw, and Molecular Weight Distribution (Mw/Mn) of Polyester]

The molecular weight distribution was measured by gel permeation chromatography measurement by the following method, and the weight average molecular weight Mw, the number average molecular weight Mn, and the molecular weight distribution (Mw/Mn) were calculated.

(1) Preparation of Sample Solution

A polyester resin was dissolved in THF to have a concentration of 0.5 g/100 mL. Next, the solution was filtered through a fluororesin filter "FP-200" (manufactured by Sumitomo Electric Industries, Ltd.) having a pore size of 2 μm to remove insolubles, thereby preparing a sample solution.

(2) Molecular Weight Distribution Measurement

As a dissolving solution, THF was flowed at a flow rate of 1 mL/min, and the column was stabilized in a thermostat bath at 40° C. 200 μL of the sample solution was injected thereinto and analyzed. The molecular weight of the sample was calculated based on the calibration curve previously prepared. The calibration curve was formed using a few types of monodispersed polystyrene (monodispersed polystyrene manufactured by Tosoh Corporation; molecular weight $1.11 \times 10^6$, $3.97 \times 10^5$, $1.89 \times 10^5$, $9.89 \times 10^4$, $1.71 \times 10^4$, $9.49 \times 10^3$, $5.87 \times 10^3$, $1.01 \times 10^3$, $5.00 \times 10^2$) as standard samples.

Measuring Apparatus: "HPLC LC-9130NEXT" (manufactured by Japan Analytical Industry Co., Ltd.)

Analysis Column: "JAIGEL-2.5-H-A"+"JAIGEL-MH-A" (both manufactured by Japan Analytical Industry Co., Ltd.)

[THF Insoluble Matter of Resin]

(1) Preparation of Sample

Using a sieve according to JIS Z8801, a powdery sample was collected which passes a 22 mesh sieve but does not pass a 30 mesh sieve. If the sample is a lump or the like, it was pulverized using a commercially available hammer and a coffee mill, and sieved as powder.

(2) Dissolution of Sample

After weighing 2.000 g of a sample into a glass bottle "M-140" (manufactured by Hakuyo Glass Co., Ltd.), 50 g of THF was added, and the inner lid and the outer lid were attached to the glass bottle. The mixture was stirred for 5 hours in a ball mill (peripheral speed: 200 mm/sec). Then, it was left to stand for 10 hours.

(3) Filtration

A glass filter (mesh standard 11G-3) attached to a previously weighed (1/1000 g unit) eggplant flask (mass A (g)) was prepared. A rubber plug capable of depressurization was used for sealing the glass filter. In the above-described sample dissolution, 20 mL of the supernatant of the dissolving solution which had been allowed to stand for 10 hours was sucked with a measuring pipet and filtered under reduced pressure using the prepared glass filter. In addition, the supernatant was obtained from the liquid level up to 2 cm below. The pressure reduction degree in the eggplant flask before filtering the dissolving solution was adjusted to 40 kPa. 20 mL of unused THF was sucked with a measuring pipet and the soluble matter attached to the glass filter was vacuum filtered.

(4) Drying

THF in the eggplant flask was removed by an evaporator under the following conditions.

Water Bath Temperature: 70° C.

Eggplant Flask Rotation Rate: 200 r/min

Reduced Pressure Degree in the Eggplant Flask during Chloroform Removal:

adjusted to 40 to 20 kPa

Time: 10 minutes

Then, after drying at 50° C. and 1 torr for 12 hours, mass B (g) of the eggplant flask was measured.

(5) Calculation of THF Insoluble Matter

THF soluble matter X (g) dissolved in 20 mL of THF was calculated.

$$X = B - A$$

THF soluble matter Y (g) dissolved in 50 g of THF was calculated using the specific gravity of THF as 0.889.

$$Y = X \times [50 / (20 \times 0.889)]$$

Soluble matter Z (% by mass) per 1 g of the sample was calculated.

$Z=(Y/2)\times 100$

THF insoluble matter (% by mass)=100−Z

THF insoluble matter (% by mass) was taken as the average value of three measurements.

[Measurement Method of Average Particle Diameter of Polyester Resin Particle]

The average particle diameter of the polyester resin particle was measured in conformity with the sieving method according to HS Z8815. 100 g of resin particles was sieved with seven sieves having a sieve opening of 2,830 µm, 2,000 µm, 1,400 µm, 850 µm, 600 µm, 425 µm, and 106 µm, respectively by using a Ro-Tap sieve shaker (manufactured by CMT Co., Ltd.), thereby determining the average particle diameter of the polyester resin particles.

[Solid Content Concentration of Aqueous Dispersion of Polyester Resin Particle]

Using an infrared moisture balance "FD-230" (manufactured by Kett Electric Laboratory), 5 g of a sample was dried at a drying temperature of 150° C. under conditions in a measurement mode 96 (monitoring time: 2.5 minutes, fluctuation range: 0.05%), thereby measuring the water of the sample (% by mass). The solid content concentration was calculated according to the following formula.

Solid content concentration (% by mass)=100−(Water of sample)(% by mass)

[Dry Strength]

Each of molded articles obtained in Examples and Comparative Examples as described later was stored at room temperature (25° C.) for 24 hours, then immersed in water at 25° C. for 2 hours. Next, retrieved from water bath, dried with a wipe, and immediately applied with a pressure of 5.08 mm/min using the following instrument. The drying strength was calculated in terms of a load which the sample could endure.

The pressure was calculated in terms of KiloNewton/surface area.

Instrument: Resistance assessment press (Mecánica Cientifica, S.A., model Ref 41.000)

[Strength after Immersion in Water]

Each of molded articles obtained in Examples and Comparative Examples as described later was immersed in water at 60° C. for 24 hours, and further immersed in water at 25° C. for 2 hours. Next, retrieved from water bath, dried with a wipe, and left to stand at 25° C. for one hour. Then, the strength was measured.

[Strength after Immersion in Petroleum]

Each of molded articles obtained in Examples and Comparative Examples as described later was immersed in gasoline (Varsol 60, petroleum heavy nafta hydrodesulfurized, boiling range: 90° C. to 230° C.) for 24 hours and then washed away with water, and further immersed in water at 25° C. for 2 hours. Next, retrieved from water bath, dried with a wipe, and left to stand at 25° C. for one hour. Then, the strength was measured.

[Production of Resin]

Production Examples a1 and a2 (Polyester Resins a1 and a2, and Polyester Resin Particles a1 and a2)

An alcohol component and a carboxylic acid component other than trimellitic anhydride, which are shown in Table 1, 20 g of tin(II) di(2-ethylhexanoate), and 2 g of tertiary butyl catechol were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at 120° C. to 205° C. for 8 hours in a mantle heater under a nitrogen atmosphere. Thereafter, the resultant was allowed to react under the reduced-pressure condition at 8 KPa for one hour. Further, trimellitic anhydride was added and allowed to react at 205° C. for one hour, and then reacted to a target Tm at 8 KPa to obtain a target polyester resin a1 or a2. Various physical properties were measured and are shown in Table 1.

Each of the resulting polyester resin a1 or a2 was pulverized using a pulverizer "SF-1" (manufactured by Sanriki Seisakusho Co., Ltd.). Polyester resin particle a1 or a2 having the particle diameter shown in Table 1 was obtained by controlling the screen opening and the rotation rate.

TABLE 1

| | | | Production Example | | | |
|---|---|---|---|---|---|---|
| | | | 1 | | 2 | |
| | | | Resin | | | |
| | | | a1 | | a2 | |
| | | | g | mol % *3 | g | mol % *3 |
| Raw material monomer | Alcohol component | BPA-PO *1 | 3150 | 50 | 3150 | 50 |
| | | BPA-EO *2 | 2925 | 50 | 2925 | 50 |
| | Carboxylic acid component | Terephthalic acid | 1793 | 60 | — | — |
| | | Fumaric acid | — | — | 1399 | 67 |
| | | Trimellitic anhydride | 691 | 20 | 691 | 20 |
| Physical Properties | Softening point (° C.) | | 142.7 | | 140.7 | |
| | Acid value (mgKOH/g) | | 6.5 | | 19.6 | |
| | Hydroxyl value (mgKOH/g) | | 41.3 | | 31.2 | |
| | Glass transition point (° C.) | | 65.8 | | 60.6 | |
| | Number average molecular weight Mn | | 2900 | | 2400 | |
| | Weight average molecular weight Mw | | 25000 | | 42000 | |

TABLE 1-continued

| | Production Example | | | |
|---|---|---|---|---|
| | 1 | | 2 | |
| | Resin | | | |
| | a1 | | a2 | |
| | g | mol % *3 | g | mol % *3 |
| THF Insoluble matter (% by mass) | 23.5 | | 26.2 | |
| Resin Particle | a1 | | a2 | |
| Particle diameter (μm) | 2000 | | 2000 | |

*1: BPA-PO: Polyoxypropylene (2.2) adduct of bisphenol A
*2: BPA-EO: Polyoxyethylene(2.2) adduct of bisphenol A
*3: Molar amount (mol %) based on 100 mol of alcohol component Production Example ak1 (Melt-Kneaded Product of Polyester Resin ak1 and Resin Particle Thereof ak1)

100 parts by mass of a binder resin mixed with the resin shown in Table 2, 5 parts by mass of carbon black "Regal 330R" (manufactured by Cabot Corporation), and 1 part by mass of polypropylene wax "NP-105" (Mitsubishi Chemical Co., Ltd.) were thoroughly stirred with a Henshel mixer, and then the mixture was melt-kneaded using a co-rotation twin screw extruder (a total length of a kneading part 1,560 mm, a screw diameter 42 mm and a barrel inner diameter 43 mm) to obtain a melt-kneaded product ak1 of polyester resin. The screw rotation speed was 200 r/min, the heating temperature in the trough was 120° C., the feed rate of the mixture was 10 kg/hr, and the average residence time was about 18 seconds. The obtained kneaded product ak1 was rolled and cooled with a cooling roller, and then pulverized to a volume median diameter (D50) of 6 μm by a jet mill to obtain a resin particle ak1 of the kneaded product.

Production Examples ak2 and ak3 (Melt-Kneaded Products ak2 and ak3 of Polyester Resin, and their Resin Particles ak2 and ak3)

Resins as shown in Table 2 were melt-kneaded using a co-rotation twin screw extruder (a total length of a kneading part 1560 mm, a screw diameter 42 mm and a barrel inner diameter 43 mm) to obtain melt-kneaded products ak2 and ak3 of polyester resin. The screw rotation speed was 200 r/min, the heating temperature in the trough was 120° C., the feed rate of the mixture was 10 kg/hr, and the average residence time was about 18 seconds. The obtained kneaded products were rolled and cooled with a cooling roller, and then pulverized using a pulverizer "SF-1" (manufactured by Sanriki Seisakusho Co., Ltd.). Polyester resin particles of ak2 and ak3 having the particle diameter shown in Table 2 were obtained by controlling the screen opening and the rotation rate. Various physical properties after melt-kneading were measured and are shown in Table 2.

TABLE 2

| Production Example | | ak1 | ak2 | ak3 |
|---|---|---|---|---|
| Resin (Melt-kneaded product) | | ak1 | ak2 | ak3 |
| Raw Material (parts by mass) | Polyester resin a1 | 100 | 100 | — |
| | Polyester resin a2 | — | — | 100 |
| | Carbon black | 5 | — | — |
| | Wax | 1 | — | — |
| Physical Properties | Softening point (° C.) | 129.6 | 131.3 | 125.6 |
| | Acid value (mgKOH/g) | 6.3 | 6.6 | 21.2 |
| | Hydroxyl value (mgKOH/g) | 40.9 | 41.5 | 32.5 |
| | Glass transition point (° C.) | 64.7 | 64.7 | 60.2 |
| | Number average molecular weight Mn | 2800 | 2800 | 2300 |
| | Weight average molecular weight Mw | 114000 | 99000 | 132000 |
| | THF Insoluble matter (% by mass) | 0.0 | 0.0 | 0.8 |
| Resin Particle | | ak1 | ak2 | ak3 |
| Particle diameter (μm) | | 6 | 2000 | 6 |

Examples 1 to 3 and Comparative Examples 1 and 2 (Asphalt Compositions)

Among 80 g of straight asphalt, 20 g of the resin particles, 600 g of crushed stone (coarse aggregate) of 2.36 to 13.2 mm, and 1,200 g of sand (fine aggregate) of less than 2.36 mm, the materials other than the straight asphalt were charged in a mixing machine for asphalt and mixed at 160° C. for 1 minute. Subsequently, the straight asphalt was added, and the contents were mixed for 2 minutes (asphalt mechanical mixer: Mecánica Cientifica, S. A., model Ref 25.0000). The resulting mixture was charged in a cylindrical molding machine having an inner diameter of 101.6 mm, an outer diameter of 114.3 mm, and a height of 177.8 mm at that temperature and molded using a compaction hydraulic press (Mecánica Cientifica, S. A., model Ref 10.2196) while increasing the pressure to 21 MPa over 3 minutes. After keeping the pressure at 21 MPa for 2 minutes, the resultant was subjected to depressurization and then cooled to room temperature for 24 hours, after which, the asphalt briquette was demolded. The various evaluation tests were carried out. The results are shown in Table 3.

Comparative Example 3 (Asphalt Composition)

Asphalt compositions were prepared in the same manner as in Example 1, except that 100 g of straight asphalt was used instead of 80 g of straight asphalt and 20 g of resin particles shown in the table. The various evaluation tests were carried out. The results are shown in Table 3.

TABLE 3

| | Straight asphalt | Resin particle | | Aggregate 1 | | Aggregate 2 | | Evaluation | | |
|---|---|---|---|---|---|---|---|---|---|---|
| | Amount *1 (parts by mass) | Kind | Amount *1 (parts by mass) | Kind | Amount *1 (parts by mass) | Kind | Amount *1 (parts by mass) | Drying strength (kPa) | Strength after immersion in water (kPa) | Strength after immersion in petroleum (kPa) |
| Comparative Example 1 | 80 | a1 | 20 | b1 | 600 | b2 | 1200 | 3200 | 2500 | 1100 |
| Example 1 | 80 | ak1 | 20 | b1 | 600 | b2 | 1200 | 5400 | 4200 | 4100 |
| Example 2 | 80 | ak2 | 20 | b1 | 600 | b2 | 1200 | 4900 | 3800 | 3600 |
| Comparative Example 2 | 80 | a2 | 20 | b1 | 600 | b2 | 1200 | 3000 | 2300 | 1100 |
| Example 3 | 80 | ak3 | 20 | b1 | 600 | b2 | 1200 | 4900 | 4000 | 3800 |
| Comparative Example 3 | 100 | None | 0 | b1 | 600 | b2 | 1200 | 2800 | 2000 | 1200 |

*1: Amount (part by mass) based on 100 parts by mass of the total of asphalt and polyester resin
b1: Crushed stone of 2.36 to 13.2 mm
b2: Sand of less than 2.36 mm As mentioned above, according to the Examples and Comparative Examples, it can be understood that the asphalt compositions for road pavement excellent in the dry strength, the strength after immersion in water, and the strength after immersion in petroleum are obtained by incorporating a melt-kneaded polyester resin in a predetermined amount.

The invention claimed is:

1. An asphalt composition for road pavement, comprising:
asphalt;
a polyester resin; and
an aggregate,
wherein the polyester resin is one subjected to melt-kneading, and
a ratio of the polyester resin is 5 parts by mass or more and 50 parts by mass or less based on 100 parts by mass of the asphalt.

2. The asphalt composition for road pavement according to claim 1, wherein the polyester resin is one subjected to melt-kneading by a kneader at 90° C. or higher and 140° C. or lower.

3. The asphalt composition for road pavement according to claim 1, further comprising 3 parts by mass or more and 10 parts by mass or less of a pigment based on 100 parts by mass of the polyester resin.

4. The asphalt composition for road pavement according to claim 3, wherein the pigment contains carbon black.

5. The asphalt composition for road pavement according to claim 1, wherein the polyester resin is composed of a polyester resin particle having an average particle diameter of 1 μm or more and 20 μm or less blended therein.

6. The asphalt composition for road pavement according to claim 1, wherein an alcohol component of the polyester resin contains 50 mol % or more of an alkylene oxide adduct of bisphenol A.

7. The asphalt composition for road pavement according to claim 1, wherein the polyester resin has an acid value of 2 mgKOH/g or more and 30 mgKOH/g or less.

8. The asphalt composition for road pavement according to claim 1, wherein the polyester resin has a hydroxyl value of 20 mgKOH/g or more and 50 mgKOH/g or less.

9. The asphalt composition for road pavement according to claim 1, wherein the polyester resin has a softening point of 90° C. or higher and 140° C. or lower.

10. The asphalt composition for road pavement according to claim 1, wherein a softening point of the polyester resin is lower than that of the polyester resin before melt-kneading by 5° C. or higher and 40° C. or lower.

11. The asphalt composition for road pavement according to claim 1, wherein the weight average molecular weight Mw of a soluble matter in tetrahydrofuran of the polyester resin after melt-kneading is at least 2 times and not more than 100 times that of the polyester resin before melt-kneading as obtained by gel permeation chromatography measurement.

12. The asphalt composition for road pavement according to claim 1, which is obtained by mixing the asphalt, the polyester resin, and the aggregate at 130° C. or higher and 200° C. or lower.

13. A method for producing an asphalt composition for road pavement, comprising:
a step of mixing asphalt, a polyester resin, and an aggregate at 130° C. or higher and 200° C. or lower,
wherein the polyester resin used in the mixing step is one subjected to melt-kneading, and
a ratio of the polyester resin is 5 parts by mass or more and 50 parts by mass or less based on 100 parts by mass of the asphalt.

14. The method for producing an asphalt composition for road pavement according to claim 13, wherein the polyester resin is a polyester having an alcohol component-derived constituent unit containing 50 mol % or more of an alkylene oxide adduct of bisphenol A and a carboxylic acid component-derived constituent unit containing 50 mol % or more of at least one selected from the group consisting of terephthalic acid and isophthalic acid and has a softening point of 90° C. or higher and 140° C. or lower and a hydroxyl value of 20 mgKOH/g or more and 50 mgKOH/g or less.

15. The method for producing an asphalt composition for road pavement according to claim 13, wherein the asphalt is straight asphalt.

16. The method for producing an asphalt composition for road pavement according to claim 13, wherein the polyester resin used in the mixing step is a polyester resin particle having an average particle diameter of 1 μm or more and 20 μm or less.

17. The method for producing an asphalt composition for road pavement according to claim 13, further comprising a step of melt-kneading a raw material mixture containing the polyester resin before the mixing step.

18. The method for producing an asphalt composition for road pavement according to claim 17, wherein the melt-kneading step is a step of melt-kneading the polyester resin until the polyester resin after melt-kneading has a softening point lower than that of the polyester resin before melt-kneading by 5° C. or higher and 40° C. or lower to obtain a polyester resin having a softening point of 90° C. or higher and 140° C. or lower.

19. The method for producing an asphalt composition for road pavement according to claim 17, wherein the melt-kneading step is a step of melt-kneading the polyester resin until the weight average molecular weight Mw of a soluble matter in tetrahydrofuran of the polyester resin after melt-kneading is at least 2 times and not more than 100 times that of the polyester resin before melt-kneading, as obtained by gel permeation chromatography measurement.

20. A road paving method comprising a step of laying an asphalt composition obtained by the method according to claim 13, thereby forming an asphalt paving material layer.

* * * * *